United States Patent [19]

Hallerbäck

[11] 4,358,692
[45] Nov. 9, 1982

[54] STATOR ASSEMBLY FOR AN ELECTRIC MOTOR

[75] Inventor: Stig L. Hallerbäck, Västra Frölunda, Sweden

[73] Assignee: Aktiebolaget SKF, Gothenburg, Sweden

[21] Appl. No.: 214,229

[22] Filed: Dec. 8, 1980

[30] Foreign Application Priority Data

Jan. 29, 1980 [SE] Sweden ............................ 8000677

[51] Int. Cl.³ .............................................. H02K 1/32
[52] U.S. Cl. ........................................ 310/42; 310/59; 310/60 A; 310/217
[58] Field of Search ................. 310/43, 58, 60 A, 65, 310/216, 217, 218, 258, 42, 52, 55, 57, 59, 64

[56] References Cited

U.S. PATENT DOCUMENTS

| | | | |
|---|---|---|---|
| 501,194 | 7/1893 | Sperry | 310/217 |
| 3,591,819 | 7/1971 | Laing | 310/217 |
| 3,612,925 | 10/1971 | Swanke | 310/42 |
| 3,932,929 | 1/1976 | Hallerback et al. | 310/42 |
| 4,142,120 | 2/1979 | Hallerbäck | 310/59 |

Primary Examiner—J. D. Miller
Assistant Examiner—D. L. Rebsch
Attorney, Agent, or Firm—Eugene E. Renz, Jr.

[57] ABSTRACT

An electric motor comprising a stator and a rotor rotatably mounted in a stator cavity. The stator is made from at least two stator sections and each section comprises a plurality of axially directed generally semi-cylindrical sheet metal laminations having axial edges which are directed inwardly to form the rotor cavity and having the area between said edges surrounded by a stator coil. Each stator part has at its axial ends a radially directed plate member including a series of axially extending spaced teeth which project and engage between the edges of the sheet metal laminations adjacent the plate member to maintain the laminations in predetermined spaced relation to allow passage of cooling medium through the stator coil.

10 Claims, 7 Drawing Figures

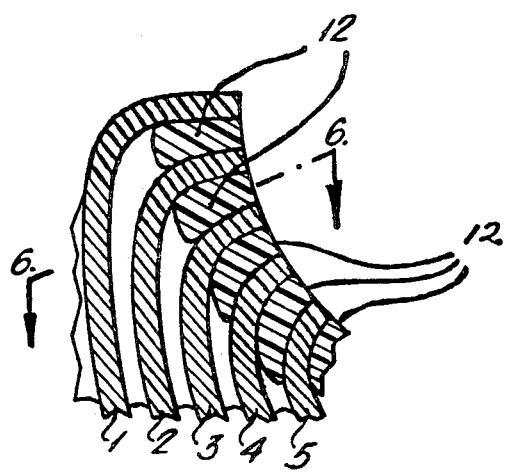
FIG. 5
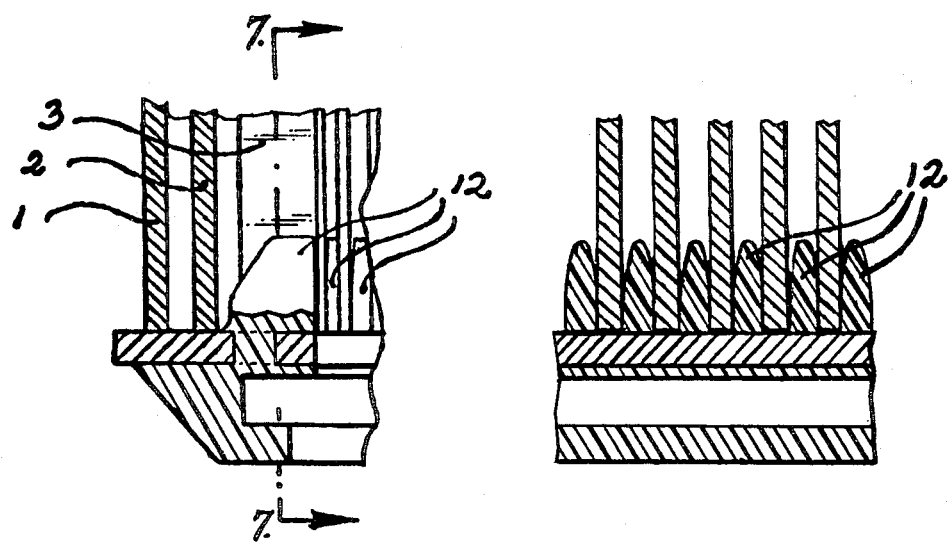
FIG. 7
FIG. 6

STATOR ASSEMBLY FOR AN ELECTRIC MOTOR

BACKGROUND AND SUMMARY OF THE INVENTION

The present invention refers to an electric machine incorporating stator and rotor and being of the type which in the stator has axially directed sheet metal laminae for the magnetic flux.

Electric machines of this type are earlier known. One type of those machines is described e.g. in Swedish Pat. No. 7216772-9. In this patent, which protects a method for manufacturing the above mentioned machine, is shown an electric motor in which the stator plates are embedded in plastic material and maintained in their predetermined positions by means of this plastic material. A motor of this type functions very well, but it can on occasion be a non-desirable operation to use a plastic embedding moulding method during the manufacture of motors. The price of the plastic material is, moreover, increasing. The stator embedded in plastic material will also become difficult to cool by means of flowing air.

The drawbacks in the above mentioned electric motors have been set aside by the present invention and an electric machine has been produced which incorporates stator and rotor with a stator built from at least two axial parts and having axially directed sheet metal laminae, the axial edges of which are bent inwards against the centre for forming the rotor cavity and which is mainly characterized in that each stator part at its axial ends is provided with a radially directed plate incorporating axially extending teeth, which are inserted between the edges of the sheet metal laminae for maintaining these spaced apart at a predetermined relative distance.

The axially extending teeth should according to the invention be of plastic material and extend from a plastic layer applied around the radial plate and they should also taper inwards against the sheet metal packet.

The plastic layer around the radial plate can be provided with a groove for attachment of the bearing carrier at the outside of the plate.

It is also suitable that the insulating casing for the stator windings is moulded to the radial plate at the same time as the other plastic moulding.

According to the invention the radial plate should be provided with mounting means, e.g. lugs, whereby it can be attached to an opposite similar plate in another of the axial parts of the stator. All radial plates forming part of the stator can be generally similar, whereby the manufacture of the plates and the stator is appreciable simplified.

As plastic material according to the invention must not be present between the sheet metal laminae it is possible to arrange spaces for circulating air between them.

DESCRIPTION OF THE DRAWINGS

The invention will hereinafter be further described with reference to the accompanying drawings.

FIG. 5 shows a section along line 5—5 in FIG. 1,
FIG. 6 shows a section along line 6—6 in FIG. 5;
and
FIG. 7 shows a section along line 7—7 in FIG. 6.

DESCRIPTION OF THE PREFERRED EMBODIMENTS

Figure 1:
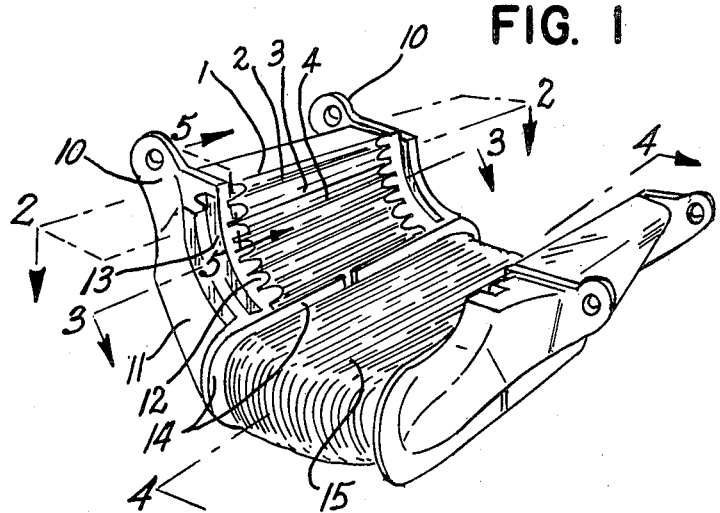
FIG. 1 shows a perspective view of a stator part according to the invention.

In FIG. 1 are shown the edges of the axially directed sheet metal laminae 1, 2, 3 and 4, which are bent inwards against the imagined rotor cavity. At each side of the sheet metal laminae 1, 2, 3 and 4 (the number can of course be larger or smaller) is shown the two axial plates 10. A plastic layer 11 is moulded upon these plates and extending from the plastic layer against the sheet metal packet are teeth 12 formed integrally with the remainder of the plastic layer. The detailed design of the teeth is shown in FIGS. 5–7.

The insulation 14 for the windings 15 can also be made integrally with the plastic layer 11. It is of course also possible that these insulation casings 14 can be made separately and be pushed into the sheet metal packet after mounting of the radial plates 10.

The stator part, of which FIG. 1 is a half, is held together by the windings 15.

Figure 2:
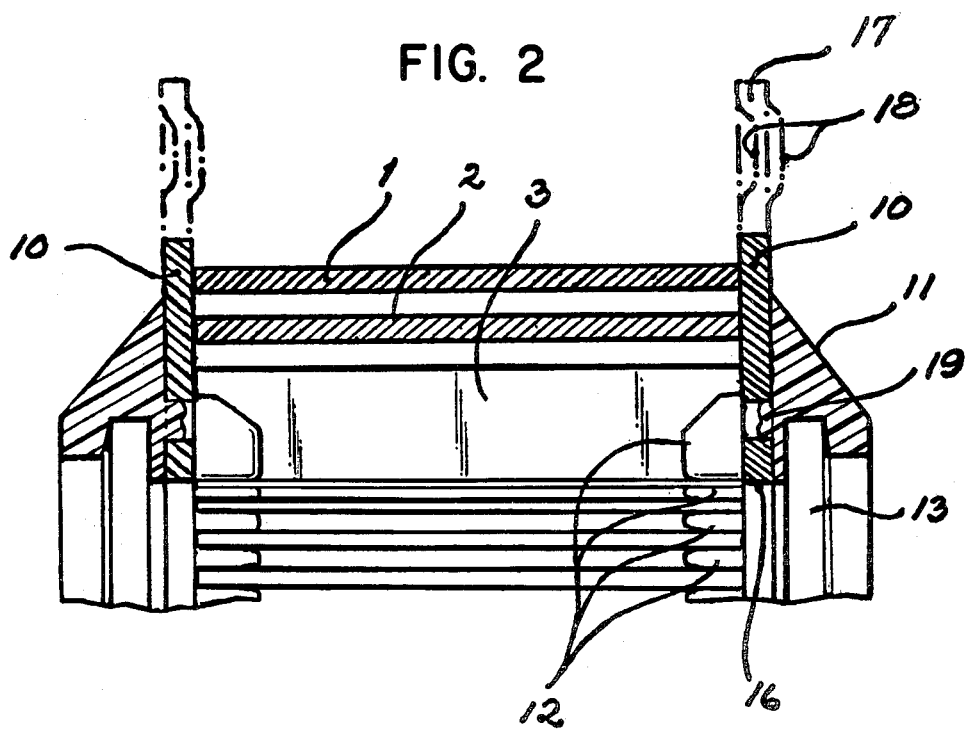
FIG. 2 shows a section along line 2—2 in FIG. 1.

FIG. 2 shows more in detail how the teeth 12 project in between the laminae 1, 2, 3 and maintain these in position. Openings 19 are made in the plates 10 for making it possible for the plastic material to surround them on both sides and to be well anchored. The thin plastic layer at the inner side of the plate between the teeth will insulate the laminae from the radial plates and will prevent eddy currents. The plastic layer 11 at the outer side of the plate 10 can be made so thick that grooves 13 for the bearing carriers can be made therein. The inner side 16 of the plate 10 defines the rotor cavity.

As intimated in the figure, the ends of the plates are provided with lugs 17 having a bend 18 for allowing the plates to be attached to similar plates in the other stator half. In this manner all plates can be made generally similar, which of course will facilitate the manufacture appreciably.

Figure 3:
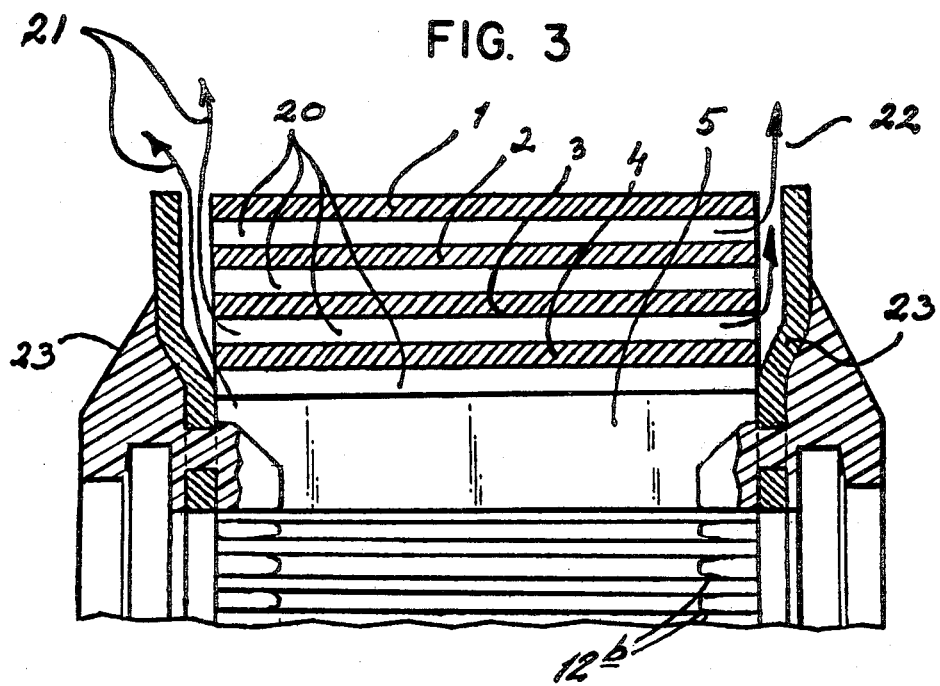
FIG. 3 shows a section along line 3—3 in FIG. 1.

FIG. 3, which is a section along line 3—3 in FIG. 1, shows how air can flow in between the sheet metal laminae and cool them. The air will be moved by the rotation of the rotor and it will be pressed out as shown by the arrows 21 and 22. In order to facilitate the flow of air the plates 10 have been bent outwards at 23 in order to form air channels 20.

Figure 4:
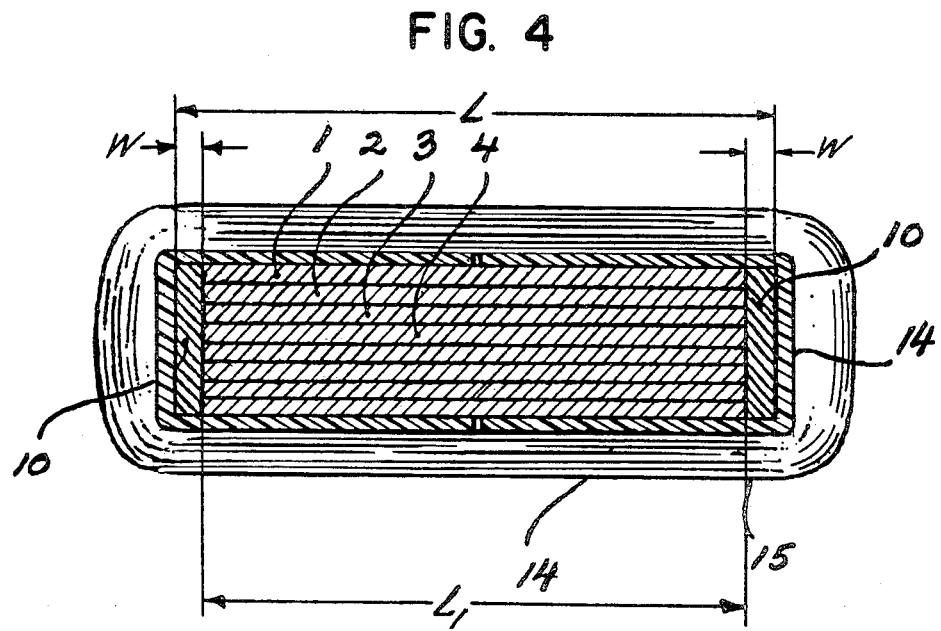
FIG. 4 shows a section along line 4—4 in FIG. 1.

FIG. 4 shows how the winding 15 is arranged around the yoke part of the sheet metal packet. The sheet metal laminae 1, 2, 3, 4 are provided with radial plates 10 at each end and are surrounded by the two part insulation casing 14.

There will be no magnetic flux in the plates 10 due to the fact that the plates are located inside the winding 15, and at a certain desired length of the motor it is thus possible to reduce the length of the sheet metal laminae 1, 2, 3, 4 with a measure corresponding to the double width of the plates 10. For example the length of the laminations indicated by the numeral L in FIG. 4 can be reduced to the length $L_1$ since the plates 10 are of the same material as the plates 1–5 inclusive and since these plates 10 are in contact with the laminations 1–5. The laminations are thereby extended magnetically by the width 2 w. Thus, it is possible to have magnetic flux through laminations of the length L or as shown in FIG. 4 by laminations $L_1+2$ w which are the same magnetically.

FIGS. 5, 6 and 7 show more in detail the design of the teeth 12. They engage between the edges of the sheet metal laminae 1, 2, 3, 4, 5 and have been given a shape which exactly corresponds to the desired bending of the sheet metal laminae. For facilitating the mounting, the teeth have been made tapering inwards against the sheet metal packet as indicated by the numeral 12b in FIG. 3.

The plane side plates have a large angular bending moment and it can easily take up the forces from the sheet metal laminae without the form tolerances being exceeded. The plates will thereby give strength to the stator packet.

As plastic material is present between the sheet metal laminae only at the edges, there will, as mentioned above, be the possibility of obtaining a flow of cooling air between them. Comparative tests between a motor built in accordance with the invention and similar motor having a plastic embedded stator and an outer cooling fan gave as a result that the motor according to the invention obtained a lower winding temperature in spite of the absence of a cooling fan.

A stator part according to the invention is manufactured thereby that a packet of sheet metal laminae is first made, whereupon the end portions of the laminae are fixed by pressing in two side plates with teeth of plastic material in accordance to the invention. As the side plates also carry the insulation for the stator windings it is possible that the next step of operation can be directly to insert the stator windings whereby the stator part is finished. For finishing the electric machine the bearing carriers are mounted on the rotor introduced in the grooves intended therefor, whereupon the stator parts are riveted or spot welded together at the mounting means.

The invention is not limited to the above mentioned embodiments but can be modified in several manners within the scope of the appended claims.

I claim:

1. An electric motor comprising a stator and a rotor rotatably mounted in a rotor cavity, the stator being made from at least two stator sections and each section comprising a plurality of axially directed generally semi-cylindrical sheet metal laminations having axial edges which are directed inwardly to form the rotor cavity and having the area between said edges surrounded by a stator coil, each stator part having at its axial ends a radially directed plate member including a series of axially extending spaced plastic teeth which project and engage between the edges of the sheet metal laminations adjacent the plate member to maintain the laminations in predetermined spaced apart relation to allow passage of cooling medium through said stator coil.

2. An electric motor comprising a stator and a rotor rotatably mounted in a rotor cavity, the stator being made from at least two stator sections and each section comprising a plurality of axially directed generally semi-cylindrical sheet metal laminations having axial edges which are directed inwardly to form the rotor cavity and having the area between said edges surrounded by a stator coil, each stator part having at its axial ends a radially directed plate member including a series of axially extending spaced teeth which project and engage between the edges of the sheet metal laminations adjacent the plate member to maintin the laminations in predetermined spaced apart relation to allow passage of cooling medium through said stator coil, said teeth tapering in a direction inwards against the sheet metal laminations.

3. An electric motor as claimed in claim 2 including a plastic layer disposed outboard of said radially directed plate and including a groove for attachment of a bearing support.

4. An electric motor as claimed in claim 2 including an insulating casing for stator windings secured to said radial plate.

5. An electric motor as claimed in claim 2 wherein said plate member is provided with mounting means for attachment to an opposite similar plate of another of the axial parts of the stator.

6. An electric motor as claimed in claim 5 wherein said attachment means includes lugs.

7. An electric motor as claimed in claim 5 wherein the radial plates forming part of the stator are of generally similar configuration.

8. An electric motor as claimed in claim 2 wherein a portion of each plate member is spaced from the end edges of said laminations radially outwardly of said teeth to form side air channels communicating with the spaces between said laminations.

9. An electric motor as claimed in claim 2 including a two part insulation casing surrounding a portion of said radial plates and laminations at opposite ends of windings which circumscribe a portion of the stator.

10. An electric motor as claimed in claim 9 wherein the length of the laminations are at least twice the width of said plate members.

* * * * *